US007502744B2

(12) United States Patent
Garrow et al.

(10) Patent No.: US 7,502,744 B2
(45) Date of Patent: Mar. 10, 2009

(54) PERFORMING PREDICTIVE MAINTENANCE BASED ON A PREDICTIVE MAINTENANCE TARGET

(75) Inventors: Gary R. Garrow, Burbank, CA (US); Charles P. Newton, III, Rock Hill, SC (US); Patrick E. Weir, San Francisco, CA (US); David P. West, II, Newnan, GA (US); Michael Wetzer, Redwood City, CA (US)

(73) Assignee: Accenture LLP, Palo Alto, CA (US)

( * ) Notice: Subject to any disclaimer, the term of this patent is extended or adjusted under 35 U.S.C. 154(b) by 926 days.

(21) Appl. No.: 09/947,024

(22) Filed: Sep. 4, 2001

(65) Prior Publication Data

US 2005/0004821 A1 Jan. 6, 2005

Related U.S. Application Data

(63) Continuation-in-part of application No. 09/690,793, filed on Oct. 17, 2000, now Pat. No. 6,980,959.

(51) Int. Cl.
*G06F 17/60* (2006.01)
(52) U.S. Cl. .................. 705/1; 705/7; 701/50; 324/754; 324/765
(58) Field of Classification Search .................. 705/1, 705/7; 324/754, 765; 701/50
See application file for complete search history.

(56) References Cited

U.S. PATENT DOCUMENTS

| 4,908,775 A | 3/1990 | Palusamy et al. |
| 5,216,612 A | 6/1993 | Cornett et al. |
| 5,311,562 A | 5/1994 | Palusamy et al. |
| 5,331,579 A | 7/1994 | Maguire, Jr. et al. |
| 5,343,388 A | 8/1994 | Wedelin |
| 5,434,775 A | 7/1995 | Sims et al. |
| 5,596,507 A | 1/1997 | Jones et al. |

(Continued)

FOREIGN PATENT DOCUMENTS

EP 1162557 A 12/2001

(Continued)

OTHER PUBLICATIONS

Parker A. Grant and James F. Mazeski; "Turbine Engine Maintenance-Back to Basics", Aircraft Maintenance Technology, Nov. 2000, retrieved from the web at: http://amtonline.com/publication/article.jsp?publd=1&id=1035.

(Continued)

*Primary Examiner*—Pierre E Elisca
(74) *Attorney, Agent, or Firm*—Brinks Hofer Gilson & Lione

(57) ABSTRACT

A method and system for performing predictive maintenance on an item of equipment comprises establishing a desired configuration of the item of equipment based on a predictive maintenance target of the item of equipment. The predictive maintenance target may include at least one of a functional configuration objective, a logical configuration objective, and an operational configuration objective. An actual configuration of the item of equipment is monitored. It is determined if the actual configuration complies with the desired configuration. An upgrade requirement is planned for upgrading the actual configuration to the desired configuration if the actual configuration is non-compliant.

18 Claims, 3 Drawing Sheets

U.S. PATENT DOCUMENTS

| | | | |
|---|---|---|---|
| 5,630,070 A | 5/1997 | Dietrich et al. | |
| 5,710,723 A | 1/1998 | Hoth et al. | |
| 5,737,728 A | 4/1998 | Sisley et al. | |
| 5,754,451 A | 5/1998 | Williams | |
| 5,778,381 A * | 7/1998 | Sandifer | 707/104.1 |
| 5,826,236 A | 10/1998 | Narimatsu et al. | |
| 5,877,961 A | 3/1999 | Moore | |
| 5,890,133 A | 3/1999 | Ernst | |
| 5,897,629 A | 4/1999 | Shinagawa et al. | |
| 5,918,219 A | 6/1999 | Isherwood | |
| 5,920,846 A | 7/1999 | Storch et al. | |
| 5,931,878 A | 8/1999 | Chapin, Jr. | |
| 5,963,911 A | 10/1999 | Walker et al. | |
| 5,970,437 A | 10/1999 | Gorman et al. | |
| 5,970,466 A | 10/1999 | Detjen et al. | |
| 5,987,474 A | 11/1999 | Sandifer | |
| 5,995,915 A | 11/1999 | Reed et al. | |
| 6,006,171 A | 12/1999 | Vines et al. | |
| 6,014,633 A | 1/2000 | DeBusk et al. | |
| 6,038,539 A | 3/2000 | Maruyama et al. | |
| 6,067,486 A * | 5/2000 | Aragones et al. | 701/29 |
| 6,078,912 A | 6/2000 | Buerger et al. | |
| 6,101,481 A | 8/2000 | Miller | |
| 6,110,214 A | 8/2000 | Klimasauskas | |
| 6,128,543 A | 10/2000 | Hitchner | |
| 6,154,735 A | 11/2000 | Crone | |
| 6,175,934 B1 | 1/2001 | Hershey et al. | |
| 6,192,325 B1 | 2/2001 | Piety et al. | |
| 6,208,955 B1 | 3/2001 | Provan et al. | |
| 6,219,654 B1 | 4/2001 | Ruffin | |
| 6,230,200 B1 | 5/2001 | Forecast et al. | |
| 6,230,480 B1 | 5/2001 | Rollins, III | |
| 6,292,806 B1 | 9/2001 | Sandifer | |
| 6,308,162 B1 | 10/2001 | Ouimet et al. | |
| 6,321,207 B1 | 11/2001 | Ye | |
| 6,349,274 B1 | 2/2002 | Kay et al. | |
| 6,418,361 B2 | 7/2002 | Sinex | |
| 6,496,814 B1 | 12/2002 | Busche | |
| 6,571,158 B2 | 5/2003 | Sinex | |
| 6,580,982 B2 | 6/2003 | Sinex | |
| 6,598,940 B2 | 7/2003 | Sinex | |
| 6,606,546 B2 | 8/2003 | Sinex | |
| 6,671,593 B2 | 12/2003 | Sinex | |
| 6,678,716 B1 | 1/2004 | Pronsati, Jr. et al. | |
| 6,684,136 B2 | 1/2004 | Sinex | |
| 6,691,006 B2 | 2/2004 | Sinex | |
| 6,691,064 B2 | 2/2004 | Vroman | |
| 6,691,244 B1 | 2/2004 | Kampe et al. | |
| 6,701,298 B1 | 3/2004 | Jutsen | |
| 6,714,829 B1 | 3/2004 | Wong | |
| 6,732,028 B2 | 5/2004 | Vanstory | |
| 6,738,748 B2 | 5/2004 | Wetzer | |
| 6,801,820 B1 | 10/2004 | Lilly et al. | |
| 6,820,038 B1 | 11/2004 | Wetzer et al. | |
| 6,980,959 B1 | 12/2005 | Garrow et al. | |
| 7,031,941 B2 | 4/2006 | Garrow et al. | |
| 7,058,587 B1 | 6/2006 | Horne | |
| 7,085,766 B2 | 8/2006 | Keith, Jr. | |
| 7,124,059 B2 | 10/2006 | Wetzer et al. | |
| 7,231,374 B1 | 6/2007 | Balasinski | |
| 2001/0053991 A1 | 12/2001 | Bonabeu | |
| 2002/0007225 A1 | 1/2002 | Costello et al. | |
| 2002/0010615 A1 | 1/2002 | Jacobs | |
| 2002/0022984 A1 | 2/2002 | Daniel et al. | |
| 2002/0072988 A1 | 6/2002 | Aram | |
| 2002/0143564 A1 | 10/2002 | Webb et al. | |
| 2002/0156692 A1 | 10/2002 | Squeglia et al. | |
| 2003/0009253 A1 | 1/2003 | McIntyre et al. | |
| 2003/0036939 A1 | 2/2003 | Flores et al. | |
| 2003/0050824 A1 | 3/2003 | Suermondt et al. | |
| 2003/0216888 A1 | 11/2003 | Ridolfo | |
| 2004/0019577 A1 | 1/2004 | Abdel-Malek et al. | |
| 2005/0187838 A1 | 8/2005 | Squeglia et al. | |
| 2007/0203779 A1 | 8/2007 | Tveit et al. | |

FOREIGN PATENT DOCUMENTS

| | | | |
|---|---|---|---|
| JP | 60165325 | | 2/1984 |
| JP | 02065201 | | 8/1988 |
| JP | 02127952 | | 11/1988 |
| JP | 07203120 | | 12/1993 |
| JP | 08180654 | | 12/1994 |
| JP | 07060449 | | 2/1997 |
| JP | 9034946 | | 2/1997 |
| JP | 10298351 | | 4/1997 |
| JP | 11210106 | | 1/1998 |
| JP | 2000015587 | | 6/1998 |
| JP | 2001034324 | | 7/1999 |
| JP | 2001209676 | | 1/2000 |
| JP | 2000124094 | | 4/2000 |
| JP | 2001092520 | | 4/2001 |
| JP | 2007137657 | * | 6/2007 |
| WO | WO 98/44439 | | 10/1998 |
| WO | WO 01/15001 | | 3/2001 |

OTHER PUBLICATIONS

Manny Gdalevitch, "MSG-3, The Intelligent Maintenance", Nov. 2000, Aircraft Maintenance Technology, pp. 1-6, retrieved from the web at: http://amtonline.com/publication/article.jsp?publd=I &id=1039.

Harry Fenton, "Magnetos Under PressureMagnetos Under Pressure", Jul. 2000, retrieved from the web at: http://amtonline.com/publication/article.jsp?publd=1 &id=992.

Jack Hessburg, "Scheduled Maintenance Tasks: Working through the development process with the Maintenance Steering Group", Mar. 2000, retrieved from the web at: http://amtonline.com/publication/article.jsp?publd=1&id=950.

Bill de Decker, "Save on Maintenance Costs", Mar. 2000, retrieved from the web at: http://amtonline.com/publication/article.jsp-?pubid=1 &id=952.

Michael M. DiMauro, "Preventive Maintenance for Thrust Reversers", Mar. 2000, retrieved from the web at: http://amtonline.com/publication/article.jsp?publd=I &id=947.

Airman 2000: simplifying and optimizing aircraft maintenance, pp. 1-3, retrieved from the web at: http://www.content.airbusworld.convsites/Customerservices/html/acrobattfast 29_pO2_07_airman.com.pdf.

Morris Cohen et al., "Optimizer: IBM's Multi-Echelon Inventory System for Managing Service Logistics", The Institute of Management Sciences, pp. 65-82, Jan. to Feb. 1990.

Vijayan, Jaikumar, "Fault-Tolerant Computing", Computerworld vol. 34, 1 page Issue 47, Mar./Apr. 2000.

The prosecution history of U.S. Appl. No. 09/690,793 shown in the attached Patent Application Retrieval file wrapper document list, printed Mar. 7, 2008, including each substantive office action and applicant response.

McQueen, G. "Aircraft Maintenance," Industrial Maintenance & Plant Operations, Aug. 1996.

MIL-HDBK-61, Military Handbook, "Configuration Management Guidance," Sep. 1997.

International Search Report dated Oct. 4, 2002, for international application PCT/US02/09303.

Written Opinion dated Mar. 5, 2003, for international application PCT/US02/09303.

International Search Report dated Dec. 28, 2001, for international application PCT/US01/32154.

International Search Report dated Jan. 2, 2002, for international application PCT/US01/32576.

The prosecution history of U.S. Appl. No. 09/825,633 shown in the attached Patent Application Retrieval file wrapper document list, printed Mar. 7, 2008, including each substantive office action and applicant response.

The prosecution history of U.S. Appl. No. 09/960,793 shown in the attached Patent Application Retrieval file wrapper document list, printed Mar. 7, 2008, including each substantive office action and applicant response.

The prosecution history of U.S. Appl. No. 09/947,136 shown in the attached Patent Application Retrieval file wrapper document list, printed Apr. 2, 2008, including each substantive office action and applicant response.

The prosecution history of U.S. Appl. No. 09/946,894 shown in the attached Patent Application Retrieval file wrapper document list, printed Mar. 7, 2008, including each substantive office action and applicant response.

The prosecution history of U.S. Appl. No. 09/946,093 shown in the attached Patent Application Retrieval file wrapper document list, printed Mar. 7, 2008, including each substantive office action and applicant response.

The prosecution history of U.S. Appl. No. 09/946,095 shown in the attached Patent Application Retrieval file wrapper document list, printed Mar. 7, 2008, including each substantive office action and applicant response.

The prosecution history of U.S. Appl. No. 09/946,032 shown in the attached Patent Application Retrieval file wrapper document list, printed Mar. 7, 2008, including each substantive office action and applicant response.

The prosecution history of U.S. Appl. No. 09/946,160 shown in the attached Patent Application Retrieval file wrapper document list, printed Mar. 7, 2008, including each substantive office action and applicant response.

The prosecution history of U.S. Appl. No. 10/799,914 shown in the attached Patent Application Retrieval file wrapper document list, printed Mar. 7, 2008, including each substantive office action and applicant response.

The prosecution history of U.S. Appl. No. 09/947,157 shown in the attached Patent Application Retrieval file wrapper document list, printed Apr. 2, 2008, including each substantive office action and applicant response.

McQueen, G., "Aircraft Maintenance," *Industrial Maintenance & Plant Operations*, Aug. 1996.

MIL-HDBK-61, Military Handbook, "Configuration Management Guidance," Sep. 1997.

International Search Report for corresponding International Application No. PCT/US01/32576, dated Jan. 2, 2002.

\* cited by examiner

US 7,502,744 B2

PERFORMING PREDICTIVE MAINTENANCE BASED ON A PREDICTIVE MAINTENANCE TARGET

This is a continuation-in-part of U.S. application Ser. No. 09/690,793, filed on Oct. 17, 2000, now U.S. Pat. No. 6,980,959 issued on Dec. 27, 2005.

FIELD OF THE INVENTION

This invention relates to a method and system for performing predictive maintenance on an item of equipment based upon a predictive maintenance target, (e.g., an objective or a configuration for the equipment).

BACKGROUND OF THE INVENTION

The performance of predictive maintenance may be based upon maintaining reliability or availability of an item of equipment for operational use. A predictive maintenance plan (e.g., a maintenance, repair and overhaul (MRO) plan) may include replacing or repairing one or more components at various times to minimize the downtime of the equipment. The decision of what components to replace or repair and when to replace components may be based upon a factor that relates to the physical condition of a component, an estimated physical condition of a component, or other similar factors. Accordingly, although a component of the equipment may comply with a desired physical condition, the overall performance of the equipment may not satisfy a desired performance standard. Thus, a need exists for performing predictive maintenance that considers one or more other factors beyond the observed physical condition of a component.

Even if the reliability of the equipment may be maintained in accordance with a limited predictive maintenance scheme, restricted to the physical condition of a component, the limited predictive maintenance scheme may be economically inefficient for a maintenance service provider. For example, the maintenance provider may suffer reduced economies of scale by purchasing duplicative and interchangeable components. Further, the maintenance provider and the equipment operator may incur additional expenses by poor timing of maintenance activities based on an insufficiently robust prediction of equipment reliability or of the useful service life of respective components. Thus, a need exists for managing the interchangeability, repair, or replacement of components in a predictive maintenance environment.

Another feature that a prior art predictive maintenance scheme may lack is a framework to support the decision of whether to repair a component or an assembly of components, rather than replace the component or assembly of components with another component. For example, the equipment may have additional downtime if an inappropriate decision is made to repair or refurbish a critical component, rather than providing a new component. Thus, a need exists for a predictive maintenance scheme that supports an enhanced maintenance decision on: (1) whether to repair or replace components (e.g., parts) of an item of equipment and (2) the determination of a suitable schedule (e.g., the most advantageous schedule) for the execution of the maintenance decision.

SUMMARY OF THE INVENTION

In accordance with the invention, the method for performing predictive maintenance on an item of equipment comprises establishing a desired configuration of the item of equipment based on a predictive maintenance target of the item of equipment. The predictive maintenance target may include at least one of a physical configuration objective, a functional configuration objective, a logical configuration objective, and an operational configuration objective. An actual configuration of the item of equipment is monitored. It is determined if the actual configuration complies with the desired configuration. An upgrade requirement is planned for upgrading the actual configuration to the desired configuration if the actual configuration is non-compliant.

DETAILED DESCRIPTION OF THE INVENTION

As used herein, a maintenance provider shall include any person or business entity that performs or supports maintenance, repair, or overhaul activity (i.e., an MRO activity) for at least one item of equipment. Similarly, maintenance, a maintenance activity or a maintenance task shall include at least one of maintenance, repair, and overhaul (i.e., MRO) of an item of equipment or a component of the equipment.

A component means a component of an item of equipment, a sub-component of an item of equipment, an assembly of an item of equipment, a system of an item of equipment, or any other constituent component of an item of equipment. A component may include, but need not include, one or more sub-components. An assembly may comprise a group of integrated or inter-related components. A material refers to a raw material, a consumable material, a component, a provision, or another equipment-related resource concerning the performance of a maintenance activity.

Figure 1:
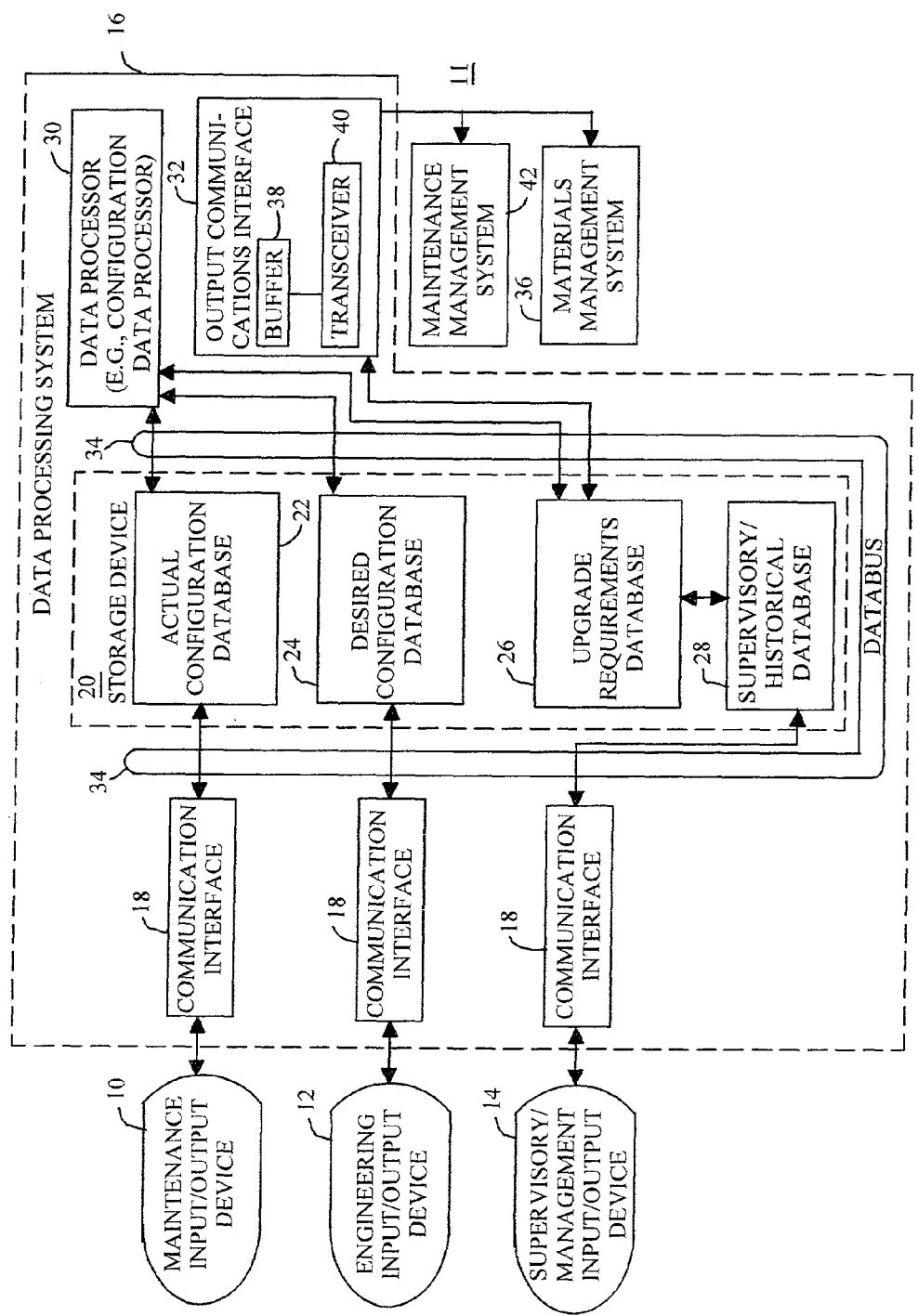
FIG. 1 is a block diagram of a predictive maintenance system in accordance with the invention.

In accordance with the invention, FIG. 1 shows a block diagram of a predictive maintenance system 11 in accordance with the invention. The predictive maintenance system 11 is adapted to manage a configuration of mechanical equipment. A maintenance input/output device 10, an engineering input/output device 12, and a supervisory input/output device 14 are coupled to a data processing system 16 to permit the input of data into the data processing system 16. The data processing system 16 may be coupled to a materials management system 36 to permit the output of data to the materials management system 36. Further, the data processing system 16 may be coupled to maintenance management system 42 to provide data for operation of the maintenance management system 42.

The data processing system 16 includes a storage device 20 coupled to a data processor 30 and communications interfaces 18 coupled to the data processor 30 via a databus 34. The databus 34 and communications interfaces 18 provide access of the input/output devices (10, 12 and 14) to one or more databases (22, 24, 26 and 28). The arrows interconnecting the components of the data processing system 16 represent data flow over the databus 34. Although only one databus is shown in FIG. 1, in other embodiments multiple databuses and/or multi-processor computer architecture may be used to practice the invention.

The storage device 20 refers to any data storage mechanism that supports a magnetic storage medium, an optical storage medium, an electronic storage medium, or any other suitable storage medium. The storage device 20 may contain an actual configuration database 22, a desired configuration database 24, a upgrade requirements database 26, and a supervisory/historical database 28. The data processing system 16 supports data storage, retrieval, and queries of the databases stored in the storage device 20.

The maintenance input/output device 10 is coupled to the actual configuration database 22 via a communications interface 18. The engineering input/output device 12 is coupled to the desired configuration database 24 via a communications interface 18. The supervisory input/output device 14 is coupled to the supervisory database 28 via a communications interface 18. In one embodiment, the maintenance input/output device 10, the engineering input/output device 12, and the supervisory input/output device 14 may represent computer work stations or other data input/output devices. In another embodiment, the maintenance input/output device 10 may comprise a monitor for manually or automatically monitoring the operational performance or longevity (e.g., time and/or operational cycle compliance) of a component (e.g., a part), an assembly, or the entire mechanical equipment. For example, the monitor may provide a report of assembly longevity data or component longevity data for storage in the actual configuration database 22.

The actual configuration database 22 and the desired configuration database 24 provide input configuration data to the data processor 30. The data processor 30 outputs upgrade requirements data to the upgrade requirements database 26 and the supervisory database 28 based on the input of the configuration data. The supervisory database 28 may include historical configuration data on previous configurations and associated performance of previous configurations of the mechanical equipment. The upgrade requirements database 26 is coupled to an output communications interface 32.

The communications interfaces 18 may comprise buffer memory coupled to transceivers. The communications interfaces 18 may support a parallel port, a serial port, or another computer port configuration.

The output communications interface 32 may comprise buffer 38 memory coupled to a transceiver 40. The output communications interface 32 is adapted to transmit upgrade requirements data, maintenance plan data, or revision data from the upgrade requirements database 26 to one or more of the following devices: (1) the materials management system 36 (e.g., purchasing system), (2) maintenance management system 42, and any other procurement or enterprise resource planning system. For example, the output communications interface 32 may contain a software interface, a hardware interface, or both to facilitate the proper exchange of information with the materials management system 36, the maintenance management system 42, a purchasing system, or an enterprise resource planning system.

The desired configuration database 24 contains desired configuration data on the mechanical equipment. The desired configuration data contains an equipment identifier (e.g., tail number of an airplane) that identifies the entire mechanical equipment, a part identifier or component identifier that identifies a component of the mechanical equipment, an assembly identifier that identifies an assembly of components of the equipment, a specification description that describes the specification of a component, and a relationship description that describes the relationship of a component to the mechanical equipment or a subassembly thereof. For example, the relationship description may include the mounting position of a component on the mechanical equipment. In one embodiment, the desired configuration database 24 may include operating restrictions on the mechanical equipment because of the presence of a particular component or a particular arrangement of components of the mechanical equipment.

The desired configuration may include at least one of a physical configuration objective, a logical configuration objective, a functional configuration objective, an operational configuration objective, a redundant configuration objective, and a self-healing configuration objective. A physical configuration defines or identifies one or more of the following: components, subcomponents, a system, and an assembly for a complete, operational item of equipment. A logical configuration defines the interrelationships among components, subcomponents, a system, an assembly, or other components of equipment. A functional configuration defines what technical specifications (e.g., performance specifications) the item of equipment is expected or desired to meet. An operational configuration defines the operational performance of a particular item of equipment, with respect to the particular item as a whole, or any of its constituent parts, including components, subcomponents, assemblies, and systems. A redundant configuration may include duplicate measures or secondary components, systems, or assemblies that take over upon the failure of primary component, system or assembly. A self-healing configuration may include architecture that is fault tolerant with respect to redundant software, redundant hardware, or other technical enhancements.

The actual configuration database 22 contains actual configuration data on the mechanical equipment that reflects an actual or present status of the mechanical equipment. The actual configuration data may include any of the following types of data: an equipment identifier that identifies the entire mechanical equipment (e.g., by class, type, or otherwise), a unique identifier (e.g., a serial number or a tail number of an airplane) that distinguishes a particular item of equipment from other items (e.g., all other items) of equipment, a component identifier (e.g., a part identifier) that identifies a component (e.g., a part) of the mechanical equipment, an assembly identifier that identifies an assembly or group of components of the equipment, a specification description that describes the specification of the component, and a relationship description that describes the relationship of a component to the mechanical equipment or a subassembly thereof. For example, the relationship description may include the mounting position of a component (e.g., a part) on the mechanical equipment. In one embodiment, the actual configuration database 22 may include operating restrictions on the mechanical equipment because of the presence of a particular component or arrangement of particular component on the mechanical equipment.

The contents of the actual configuration database 22, the desired configuration database 24, and the upgrade requirements database 26 may vary with time. Accordingly, configuration data on a particular mechanical equipment may only remain valid for a limited duration. Upon or before expiration of the duration, the configuration is preferably updated. If the contents of the databases are updated with sufficient frequency to avoid outdated configuration data, the update procedure may be referred to as a real-time procedure. The real-time procedure seeks to minimize inaccuracy of the configuration data by reflecting changes to the actual configuration of the mechanical equipment as the changes occur with a minimal lag time thereafter. Changes to the actual mechanical equipment may be necessary or proper to facilitate improvement of the actual configuration. Thus, the data processing system 16 permits maintenance activities (e.g., maintenance, repair or overhaul) to be coordinated in real time on an ongoing basis with the latest actual configuration data and the latest upgrade requirements.

The actual configuration may be defined by one or more of the following: observed physical configuration data, observed functional configuration data, an observed logical configuration data, and observed operational configuration data. The desired configuration may be expressed in terms of one or more of the following configuration objectives: a physical configuration objective, a functional configuration objective, a logical configuration objective, and an operational configuration objective.

The observed physical configuration data and the physical configuration objective are collectively referred to as physical configuration data. The observed functional configuration data and functional configuration objective are collectively referred to as functional configuration data. The observed logical configuration data and the logical configuration objective are collectively referred to as logical configuration data. The observed operational configuration data and the operational configuration objective are collectively referred to as operational configuration data.

The physical configuration data may generally include one or more of the following: component identifiers, sub-component identifiers, assembly identifiers, and system identifiers, along with data associated with a particular item identifier or equipment identifier. The item identifier or equipment identifier may be a serial number. For example, where the equipment is an aircraft, the equipment number may be regarded as a tail number. The item number or equipment number provides a unique identification for the particular item of equipment to distinguish that particular item from other items (e.g., similar items) of equipment. A physical configuration may refer to a specific instance of a logical configuration, data of the physical configuration is with reference to a particular end item.

Functional configuration data may describe the specifications, such as technical specifications for the equipment. The functional configuration data may define the configuration in terms of what the operational limitations, functional specifications or capabilities of the equipment are or are expected to be. For example, the functional configuration may describe the operating capacity of the end item of the equipment.

The logical configuration data may define components or the interrelationship between components or assemblies or systems. The logical configuration data may describe interrelationships and organization of the constituent members of the item of equipment.

The operational configuration data may take into account the usage and performance of the equipment in an operational environment. The operational configuration data may include the operational data on one or more of the following: number of cycles of a system of the equipment, a number of hours of usage, another usage measurement data associated with the particular item or the particular equipment. Operational configuration data may be gathered by a sensor or a person associated with the equipment, by a system of the equipment, by a component of the equipment or otherwise. The operational configuration may define the number of cycles or the operational history that a particular physical configuration has progressed through during its lifetime. The operational configuration may also define how the end item has been performing after the replacement of a particular component or a particular assembly in the end item.

In one example, a maintenance worker, such as a technician or a mechanic who is responsible for maintaining or repairing the mechanical equipment, enters actual configuration data (e.g., observed configuration data) into the actual configuration database 22 during or after an inspection or servicing of the mechanical equipment. The inspection may involve a visual inspection, a physical inspection, a mechanical test, an electrical test, disassembly of portions of the mechanical equipment, or other activities that might uncover defects or nonconformities with respect to the desired configuration. The data processing system 16 updates the actual configuration data in the actual configuration database 22 as soon as possible after the inspection or the servicing of the mechanical equipment to maintain the accuracy of the actual configuration database 22. For example, the maintenance input/output device 10 may be a portable electronic device that is equipped to establish a wireless communications link or otherwise communicate with the data processing system 16.

The data processor 30 compares the actual configuration to the desired configuration. The difference between the actual configuration and the desired configuration may be referred to as the upgrade requirement. The upgrade requirement or revision defines the departure of the actual configuration from the desired configuration and indicates the necessary actions to bring the mechanical equipment into conformity with the desired configuration. The data processor 30 determines the upgrade requirement. The data processor 30 may express the upgrade requirement in terms of (1) a component requirement (e.g., part, assembly or subassembly requirement) and (2) a human resource requirement that is required to bring the actual configuration in conformity with the desired configuration. The upgrade requirements may contain component identifiers of old components that require updating of a particular mechanical equipment to gain compliance with the desired configuration. The component requirement is not limited to electrical or mechanical hardware. For example, the component requirement may include modifications of software features and software instructions that are associated with or integral to the functioning of the mechanical equipment. The human resource requirement may include the scheduling of one or more maintenance workers (e.g., technicians and mechanics) to install, repair, adjust, reconfigure, replace or otherwise perform a service associated with the component requirement for the mechanical equipment.

The data processor 30 may define an interim solution to eliminate potential delay in the execution of a complete upgrade to the mechanical equipment. For example, the interim solution may reduce or eliminate the delay for an upgrade, where requisite components are not immediately available or qualified service personnel are not available for a complex service procedure. The interim solution covers the time period after a noncompliance with the desired configuration is detected and prior to placing the actual configuration in conformity with the desired configuration. The interim solution may define time/operational limitations or restrictions for the mechanical equipment prior bringing the discrepant component of the mechanical equipment into conformity. The interim solution may entail restricted usage of the non-conforming equipment. Further, the human resources requirement may include provisional operational training to properly operate the mechanical equipment under the time/operational limitations or restrictions.

The component requirements (e.g., part requirements) are forwarded over the output communications interface 32 to the materials management system 36 or another computer system that supports acquisition of components for the mechanical equipment. The materials management system 36 is a computer system for obtaining components for the mechanical equipment from a supplier or obtaining components from existing internal sources (e.g., a parts depot, warehouse, internal manufacturing source, or the like). The component requirements may include a quantity, a description, a manufacturer's equivalent component (e.g., part) number, or other component (e.g., part) parameters. With respect to mechanical equipment that has a software component, the component requirements may include version or revision information or any other parameter necessary to provide the upgrade of the software configuration associated with the mechanical equipment.

In an alternative embodiment, the components requirements are forwarded over to an enterprise resource planning system, rather than the materials management system 36. An enterprise resource planning system is a computer system that facilitates the exchange of information between different operational or business systems of a business entity. For example, an enterprise resource planning system may facilitate the exchange of information between purchasing, engineering, manufacturing, and management systems of a corporation.

In general, the supervisory database 28 supports management's oversight of the managing of the configuration. Additionally, the supervisory database 28 retains the historical records of prior configuration alterations. The supervisory database 28 tracks historic configurations of the mechanical equipment and any associated failure or defect with historic configurations. A description of the failure or defect, a date of detection of the failure of defect, determined causal factors from failure analysis activities, and resolution or repair of the failure or defect are preferably noted in the supervisory database 28. The foregoing failure or defect data may supplement or be used to update mean-time-between failure (MTBF) data provided by the manufacturer on components or assemblies of the equipment. In turn, the updated MTBF may be used to change the desired configuration with input from engineering over the engineering input/output device 12.

The supervisory database 28 may record approvals of engineering changes to the desired configuration database 24. In addition, the supervisory database 28 may record and archive approvals of work, past configurations, or inspections by maintenance staff. Thus, the supervisory database 28 promotes accountability of mechanics, technicians, engineers, and management for activities related to managing the configuration. This supervisory database 28 may represent a repository of historical records, including satisfaction records of executed configuration changes for the purpose of regulatory compliance, safety compliance, or otherwise.

The planning module 110 supports decisions on whether to repair or replace a particular component of an item of equipment. The decision to repair or replace may be based upon economic data, on the cost of replacement versus the cost of repair, reliability of a repaired component versus a replaced component, shipment and ordering time for a new component, whether a new component is in inventory, repair time for repairing the component or other factors. The planning module 110 may consider one or more of the foregoing factors to determine whether or not to replace or repair a component. The supervisory management input/output device 14 may have the ability to override such a decision to repair or replace a component. Similarly, the engineering input/output device 12 may be given authority to override such a decision.

Figure 2:
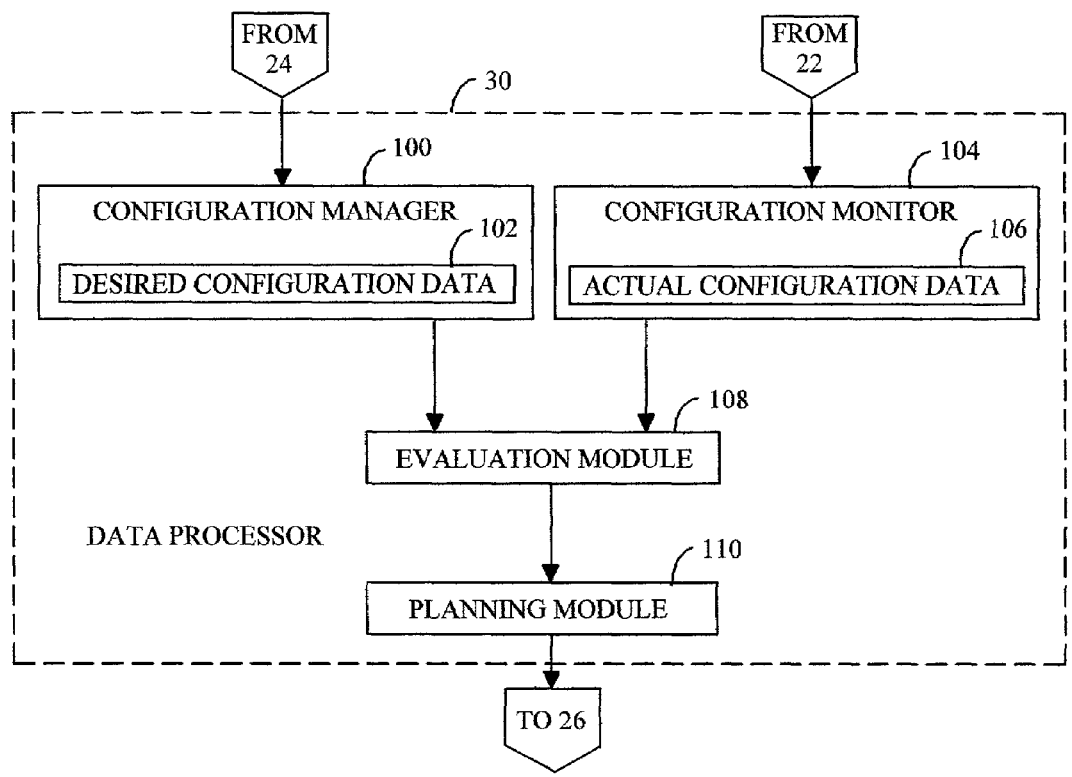
FIG. 2 is a block diagram which shows an illustrative example of the data processor of FIG. 1 in greater detail.

FIG. 2 shows the data processor 30 of FIG. 1 in greater detail. The data processor 30 of FIG. 2 includes a configuration manager 100 and a configuration monitor 104 coupled to an evaluation module 108. In turn, the evaluation module 108 is coupled to a planning module 110. The desired configuration database 24 provides desired configuration data as input to the configuration manager 100. The actual configuration database 22 provides actual configuration data as input to the configuration monitor 104. The output of the planning module 110 is coupled to an upgrade requirements database 26.

In an alternate embodiment, the output of the planning module 110 is coupled to the output communications interface 32.

The configuration manager 100 stores and retrieves desired configuration data 102 for the evaluation module 108, whereas the configuration monitor 104 stores and retrieves actual configuration data 106 for the evaluation module. The desired configuration data 102 may include one or more of the following: a physical configuration objective, a functional configuration objective, a logical configuration objective, an operational configuration objective, a redundant configuration objective, and a self-healing configuration objective. Similarly, the actual configuration data 106 may include one or more of the following: observed physical configuration data, observed functional configuration data, observed logical configuration data, an observed operational configuration data, redundant operational configuration data, and self-healing operational configuration data.

The presence and availability of self-healing and redundant systems may reduce the need for maintenance at particular times to maintain the availability of the equipment or may lead to more convenient scheduling of replacement for the equipment. Further, certain configurations may be modified to increase the level of redundant equipment such that repairs can be performed with more regularity or in accordance with a desired maintenance schedule that is more efficient for a maintenance service provider.

The evaluation module 108 accepts input from the configuration manager 100 and the configuration monitor 104. The evaluation module 108 compares the actual configuration of an item of equipment to the desired configuration of the item of equipment. The evaluation module 108 determines if the actual configuration complies with the desired configuration. If the actual configuration does not comply with the desired configuration, then the planning module 110 is alerted.

The multiple aspects of the configurations of an end item may be referred to as a multi-dimensional configurations where two or more aspects of a configuration are present. For example, where two or more of the following aspects of a configuration are present, the configuration may be regarded as multi-dimensional: physical configuration data, logical configuration data, operational configuration data, a self-healing configuration data, a redundant configuration, and functional configuration data.

The observed configuration data for one or more dimensions is compared to the configuration objective for one or more corresponding configuration dimensions to determine whether the actual configuration complies with the desired configuration. For example, the observed logical configuration data is compared to the logical configuration objective to determine whether the actual configuration complies with the desired configuration. Unanimous or substantial compliance of all considered configuration dimensions is generally required to establish compliance of the actual configuration with the desired configuration.

The planning module 110 plans an upgrade requirement for upgrading the actual configuration to the desired configuration if the actual configuration is not compliant. Both the evaluation module 108 and the planning module 110 may support multi-dimensional handling of configurations. Multi-dimensional means that the evaluation module 108 may consider multiple configuration dimensions in determining whether the actual configuration data 106 monitored is compliant with the desired configuration data 102. For example, the evaluation module 108 may consider if two or more of the following configuration aspects are compliant: a logical configuration, a functional configuration, a physical configuration, operational configuration, self-healing configuration, and redundant configuration. Accordingly, even if the actual monitored configuration data is compliant with the desired configuration for one dimension, the evaluation module 108 may determine that the actual configuration data 106 is non-compliant for another dimension with respect to the desired configuration data 102.

In such a case of noncompliance of the actual configuration with respect to the desired configuration, the information is provided to the planning module 110 so that the planning module 110 may plan for upgrading the actual configuration to the desired configuration for the deficient dimension of the item of equipment. For example, an item of equipment may comply with a logical and a physical configuration with respect to the desired configuration data 102. However, that same item of equipment may have actual configuration data 106 that is non-compliant with respect to the desired configuration data 102 in the operational configuration dimension.

In one example, the compliance of the actual configuration to the desired configuration requires compliance of the observed operational configuration data to the operational configuration objective to assure that the item of equipment complies with a minimal level of performance. Accordingly, the predictive maintenance planned in accordance with this invention is invoked such that the performance of the end item of equipment is maintained. The performance of the item of equipment is maintained, even if a reliability or availability of the equipment would not otherwise suffer because at least one other configuration dimension besides the operational configuration is satisfied.

The planning module 110 may be associated with an analyzer (not shown) within the data processor 30. The analyzer may provide economic information and reliability data about the components, assemblies or other parts of an end item of equipment such that the planning module 110 can determine one or more of the following: (1) whether repair or replacement of a particular component or a particular assembly is more appropriate and (2) the timing of the recommended maintenance action or actions. The timing of the recommended maintenance activity may include establishing a time interval or date for the maintenance activity to foster compliance with a multidimensional configuration in a manner that minimizes downtime of an item of equipment.

Figure 3:
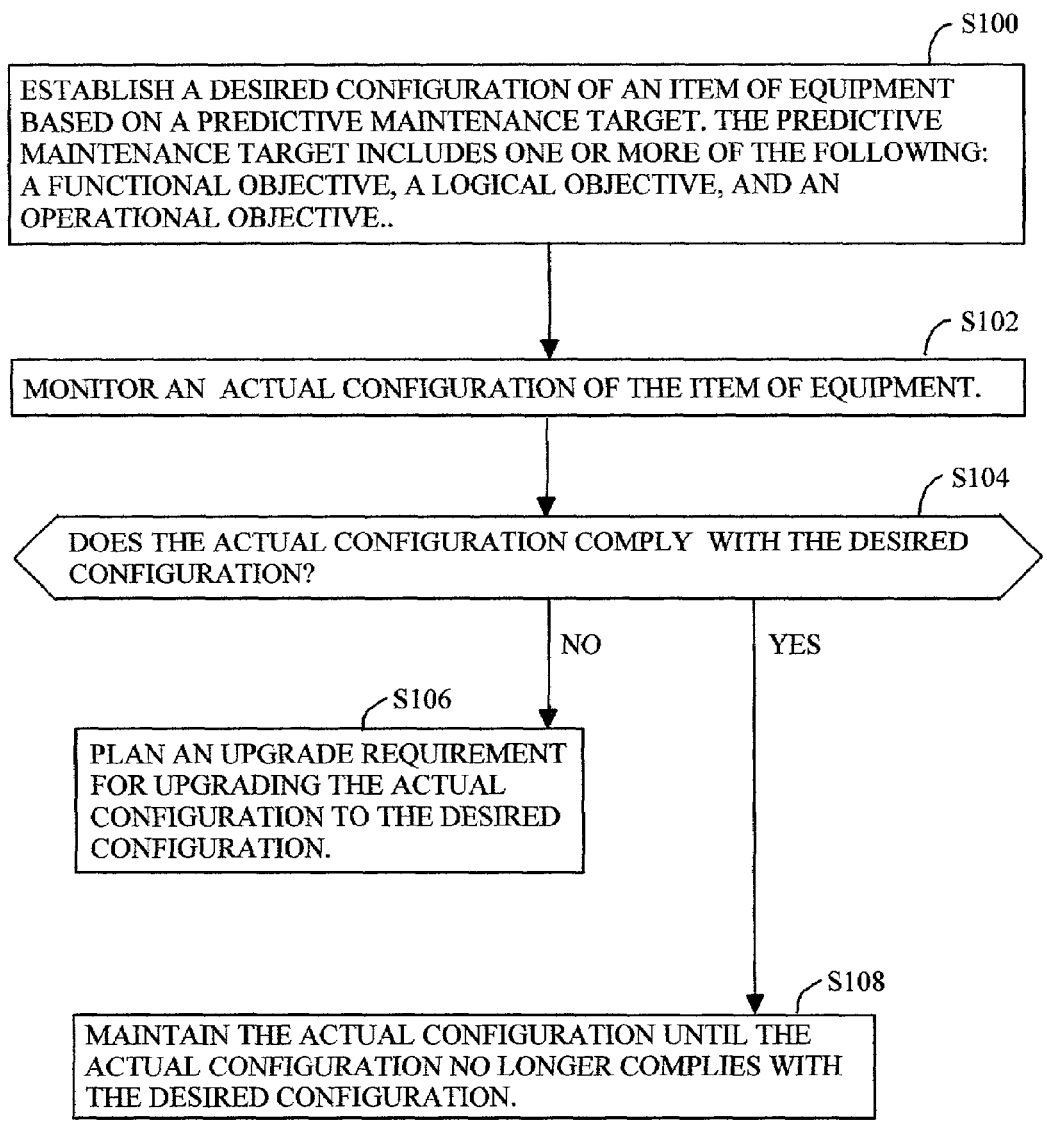
FIG. 3 is a flow chart of a method for performing predictive maintenance in accordance with the invention.

FIG. 3 is a flow chart of a method for performing predictive maintenance on an item of equipment. The method of FIG. 3 starts at step S100.

In step S100, the desired configuration of an item of equipment is established based on a predictive maintenance target. The desired configuration may be established by entering data to the data processing system 16. The desired configuration may be established by input of an engineering input/output device 12, a supervisory management input/output device 14, or both. The predictive maintenance target includes one or more of the following: a physical configuration objective, a functional configuration objective, a logical configuration objective, an operational configuration objective, a redundant configuration objective, and a self-healing configuration objective.

The definitions of physical configuration, functional configuration, logical configuration, operational configuration, redundant configuration and self-healing configuration were previously set forth herein and apply to FIG. 3 with respect to the physical configuration objective, the functional configuration objective, the logical configuration objective, the operational configuration objective, the redundant configuration objective and the self-healing configuration objective, respectively.

The logical configuration objective may define whether a suitable replacement component, a suitable equivalent component, or a suitable substitute component exists for a subject component of an item of equipment. The suitability of the replacement for a component may be determined based on empirical data, historical statistics, a manufacturer's specification, a supplier recommendation, an engineering recommendation, a governmental requirement, or a manufacturer's recommendation related to the component or an analogous component.

The logical configuration may allow similar items of equipment and different items of equipment to share and interchange components. The sharing of components among items of equipment may lead to reduced overall inventory of components and improved logistics in managing the acquisition of the components. For example, the maintenance provider may reduce the number of components required to maintain a group of equipment sharing common components or may increase the size of purchase orders to suppliers to cover maintenance of a group of equipment that shares common components.

Step S100 may be carried out in accordance with several alternate techniques. Under a first technique, the operational configuration objective may be determined consistent with an item of equipment meeting a performance metric of a group of equipment of the same class or general type as the equipment. Accordingly, the weak-performing items of equipment may be weeded out or separated from the stronger performing items of equipment for implementation of a custom-tailored maintenance plan. The weak-performing items may be subject to more frequency predictive maintenance or retired from service prematurely, for example.

Under a second technique, the logical configuration objective may be defined as a decision to substitute a generally suitable replacement component for an existing component of the item. The replacement decision may be invoked to the exclusion of repairing the existing component.

Under a third technique, a repair versus replacement decision of a component may be defined as a logical configuration objective. The determination of whether to repair or replace a component may be determined based on empirical data, historical statistics, a manufacturer's specification, a supplier recommendation, an engineering recommendation, a governmental requirement, or a manufacturer's recommendation related to the component or an analogous component. In one example, the logical configuration objective may represent the decision to repair an existing component, rather than substitute a generally suitable replacement component for an existing component of the item. In another example, the logical configuration objective may be defined as a decision to repair a component, rather than to replace the component in kind, or vice versa.

In accordance with a fourth technique for executing step S100, the operational configuration objective may be defined as a measurement of at least one component of the item with respect to at least one operating requirement and an associated operating environment. Similarly, the operational configuration objective may be defined as a measured response of an assembly of the item to at least one operating requirement and an associated operating environment. The term "assembly" shall include a system of the item of equipment.

In step S102, a monitor is an actual configuration of the item of equipment. The monitoring of the equipment may be carried out in any of the following ways: (1) manually by physical inspection of the equipment, (2) via performance reports made during use of the equipment, or (3) automatically by sensors mounted on the equipment that report back to a configuration monitor 104 in the data processing system 16. The observed dimensions of the actual configuration may include one or more of the following: an observed physical configuration, an observed functional configuration, an observed logical configuration, and an observed operational configuration, an observed self-healing configuration, and an observed redundant configuration.

The reliability of the item of equipment may be enhanced by the incorporation of redundant components in the actual configuration. Similarly, the reliability of the item of equipment may be enhanced by the incorporating a self-healing system into the actual configuration. The self-healing confirmation and the redundant components may increase the flexibility in scheduling maintenance, as well as reducing downtime or inoperable durations of the equipment.

In step S104, the data processor 30 determines if the actual configuration complies with the desired configuration. The actual configuration and the desired configuration may be compared on the basis of one or more configuration dimensions. In accordance with the invention, the actual configuration and the desired configuration are preferably compared in two or more dimensions. If any one of the two or more dimensions are deficient then the actual configuration does not comply with the desired configuration. Accordingly, if the desired monitored configuration does not comply with the desired configuration, then the method continues with step S106. However, if the actual configuration does comply with the desired configuration on a multi-dimensional basis, then the method continues with step S108.

In step S106, a planning module 110 of the data processor 30 plans an upgrade requirement or maintenance plan for upgrading the actual configuration to comply with the desired configuration. The upgrade plan may only address the deficient dimension or deficient dimensions of the actual monitored configuration of an item of equipment. The compliant dimensions of the configuration may not be addressed by the planning module 110.

In step S108, the data processor 30 maintains the actual configuration until the actual configuration no longer complies with the desired configuration in at least one dimension. When the actual configuration no longer complies, then the planning module 110 may be invoked to propose the necessary resultant maintenance plan to correct the deficiency.

The method and system of the invention not only promotes availability and reliability of an item of equipment, but rather promotes management of the predictive maintenance of an item of equipment in a proactive manner that may be used to manage costs of predictive maintenance. The cost savings of the predictive maintenance may result in the specification of multi-dimensional configurations that support definitions for the interchangeability of parts, components, assemblies, and systems of different items of equipment. The support for the interchangeability of components and the performance of predictive maintenance may lead to a reduction of inventory of components associated with conducting a certain level of predictive maintenance. Further, the items of equipment may be analyzed with reference to the degree of interchangeability of components such that capital expenditures for new equipment will be consistent with existing equipment on an interchangeability basis.

The economic considerations in the repair or replacement may lead to cost savings for the maintenance service provider. Because the actual configurations are compared with the desired configuration on a multi-dimensional basis, the predictive maintenance may be used to proactively manage the predictive maintenance of end items. Where an end item of equipment contains self-healing systems or redundant systems, the maintenance may be delayed or scheduled to coordinate the maintenance with other maintenance activities, for example. Further, the supervisory management input/output device 14 and the engineering input/output device 12 support the re-definition of a desired configuration such that a desired configuration may incorporate a self-healing system or a redundant system for the purpose of making predictive maintenance more convenient or economical for the service provider.

The foregoing description of the invention describes several illustrative embodiments. Other embodiments, variations, alterations or alternatives may fall within the scope of the invention and the following claims. Accordingly, the claims should be accorded the broadest interpretation possible consistent with the specification set forth in the description.

The following is claimed:

1. A method of performing predictive maintenance on an item of equipment, the method comprising the steps of:
    establishing a desired configuration of the item of equipment based on a predictive maintenance target of the item of equipment;
    wherein the predictive maintenance target includes at least one of a physical configuration objective, a functional configuration objective, a logical configuration objective, and an operational configuration objective;
    wherein the functional configuration objective of the item is consistent with meeting a performance metric of a group of equipment;
    subjecting items of the group of equipment to more frequent predictive maintenance than other items of the group of equipment or prematurely retiring the items from service in accordance with the performance metric;
    evaluating an actual configuration of the item of equipment;
    determining if the actual configuration complies with the desired configuration;
    planning an upgrade requirement if the actual configuration is noncompliant
    establishing a real-time procedure comprising:
        changing the actual configuration, the desired configuration and the upgrade requirement with time;
        maintaining the actual configuration and the desired configuration on a selected item of equipment valid for a limited duration; and
        updating the actual configuration and the desired configuration prior to expiration of the limited duration to avoid an outdated configuration.

2. The method according to claim 1 wherein the establishing comprises defining the logical configuration objective as a decision to substitute a generally suitable replacement component for an existing component of the item, rather than repair the existing component.

3. The method according to claim 1 wherein the establishing comprises defining the logical configuration objective as a decision to repair an existing component, rather than substitute a generally suitable replacement component for an existing component of the item.

4. The method according to claim 1 wherein the establishing comprises defining the logical configuration objective as a decision to repair a component, rather than to replace the component in kind.

5. The method according to claim 1 wherein the establishing comprises defining the logical configuration objective as a decision to replace the component in kind, rather than repair a component.

6. The method according to claim 1 wherein the establishing comprises defining the operational configuration objective as a measured response of the item to at least one operating requirement and an associated operating environment.

7. The method according to claim 1 wherein the establishing comprises defining the operational configuration objective as a measured response of a component of the item to at least one operating requirement and an associated operating environment.

8. The method according to claim 1 wherein the establishing comprises defining the operational configuration objective as a measured response of a system of the item to at least one operating requirement and an associated operating environment.

9. The method according to claim 1 further comprising enhancing the reliability of the item by incorporating redundant components into the desired configuration.

10. The method according to claim 1 further comprising enhancing the reliability of the item by incorporating a self-healing system into the desired configuration.

11. A system for performing predictive maintenance on an item of equipment, the system comprising:
a desired configuration database for storing a desired configuration of the equipment based on a predictive maintenance target of the item of equipment;
wherein the predictive maintenance target includes at least one of a physical configuration objective, a functional configuration objective, a logical configuration objective, and an operational configuration objective;
wherein the functional configuration objective of the item is consistent with meeting a performance metric of a group of equipment;
wherein items of the group of equipment are subjected to more frequent predictive maintenance than other items of the group of equipment or prematurely retired from service in accordance with the performance metric;
an actual configuration database for storing an actual configuration of the equipment based on an evaluation of the equipment; and
a data processor determining if the actual configuration complies with the desired configuration, the data processor determining an upgrade requirement for upgrading the actual configuration to the desired configuration if the actual configuration is noncompliant, wherein the data processor further defines an interim solution that eliminates delay in the execution of the upgrade requirement on the item of equipment, the interim solution covers time periods after a noncompliance with the desired configuration is detected and prior to placing the actual configuration in conformity with the desired configuration, and the interim solution requires restricted usage of the item of equipment whose actual configuration does not comply with the desired configuration and requires provisional operational training of human resource.

12. The system according to claim 11 wherein the logical configuration objective is defined as a decision to substitute a generally suitable replacement component for an existing component of the hem, rather than repair the existing component.

13. The system according to claim 11 wherein the logical configuration objective is defined as a decision to repair an existing component, rather than substitute a generally suitable replacement component for an existing component of the item.

14. The system according to claim 11 wherein the logical configuration objective is defined as a decision to repair a component, rather than to replace the component in kind.

15. The system according to claim 11 wherein the logical configuration objective is defined as a decision to replace the component in kind, rather than repair a component.

16. The system according to claim 11 wherein the operational configuration objective is defined as a measured response of the item to at least one operating requirement and an associated operating environment.

17. The system according to claim 11 wherein the operational configuration is defined as a measured response of a component of the item to at least one operating requirement and an associated operating environment.

18. The system according to claim 11 wherein the operational configuration objective is defined as a measured response of a system of the item to at least one operating requirement and an associated operating environment.

* * * * *

UNITED STATES PATENT AND TRADEMARK OFFICE
CERTIFICATE OF CORRECTION

| | | |
|---|---|---|
| PATENT NO. | : 7,502,744 B2 | Page 1 of 1 |
| APPLICATION NO. | : 09/947024 | |
| DATED | : March 10, 2009 | |
| INVENTOR(S) | : Gary R. Garrow et al. | |

It is certified that error appears in the above-identified patent and that said Letters Patent is hereby corrected as shown below:

In the Claims

Column 14, claim 12, line 17, after "component of the" delete "hem," and substitute --item,-- in its place.

Signed and Sealed this

Fourth Day of August, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,502,744 B2 | Page 1 of 1 |
| APPLICATION NO. | : 09/947024 | |
| DATED | : March 10, 2009 | |
| INVENTOR(S) | : Garrow et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1238 days.

Signed and Sealed this
Fourteenth Day of June, 2011

David J. Kappos
*Director of the United States Patent and Trademark Office*